United States Patent [19]

Lebowitz

[11] Patent Number: 4,825,457
[45] Date of Patent: Apr. 25, 1989

[54] CELLULAR NETWORK DATA TRANSMISSION SYSTEM

[76] Inventor: Mayer M. Lebowitz, 5515 Northaven Rd., Dallas, Tex. 75229

[21] Appl. No.: 186,472

[22] Filed: Apr. 25, 1988

[51] Int. Cl.$^4$ .................... H04M 11/04; H04M 7/04
[52] U.S. Cl. ................................ 379/40; 379/59; 358/108
[58] Field of Search .................... 379/37–44, 379/46–51, 59, 60; 358/108; 455/56; 375/5

[56] References Cited

U.S. PATENT DOCUMENTS

| | | | |
|---|---|---|---|
| 3,744,043 | 7/1973 | Walden et al. | 379/50 X |
| 3,914,692 | 10/1975 | Seaborn, Jr. | |
| 4,131,849 | 12/1978 | Freeburg et al. | 375/5 |
| 4,137,429 | 1/1979 | Stockdale | 379/42 |
| 4,156,867 | 5/1979 | Bench et al. | 375/5 X |
| 4,284,849 | 8/1981 | Anderson et al. | 379/38 |
| 4,339,746 | 7/1982 | Ulicki et al. | 379/50 X |
| 4,414,661 | 11/1983 | Karlstrom | |
| 4,450,320 | 5/1984 | Ostermann et al. | 379/45 |
| 4,511,886 | 4/1985 | Rodriguez | 358/108 |
| 4,577,182 | 3/1986 | Milsap et al. | 340/539 |
| 4,593,273 | 6/1986 | Narcisse | 340/539 |
| 4,598,272 | 7/1986 | Cox | 340/539 |
| 4,688,244 | 8/1987 | Hannon et al. | 379/44 X |
| 4,716,582 | 12/1987 | Blanchard et al. | 379/50 X |
| 4,718,079 | 1/1988 | Rabito | 379/39 X |
| 4,742,336 | 5/1988 | Hall et al. | 379/40 X |

FOREIGN PATENT DOCUMENTS

| | | | |
|---|---|---|---|
| 2191365 | 12/1987 | United Kingdom | 379/40 |
| 2194119 | 2/1988 | United Kingdom | 379/40 |

OTHER PUBLICATIONS

NAPCO Security Systems, Inc., Copiague, NY, brochure, "DD-1486, 6 Zone Communicator", ©NAPCO, 1982.
Motorola, Inc., Brochure, "The Cellular Connection TM Accessory", RO-10-82, ©Motorola, Inc. 1986.
Motorola, Inc., "The Cellular Connection TM, Cellular Mobile Telephone Intelligent RJ11C Interface", Instruction Manual 68P81071E30-0, 6/30/86, pp. 1,4,6,7.
Robot Research, Inc., ROBOT RVS3000RX Phoneline Video Receiver, Installation & Operation Manual, Feb. 1987, Rev. B.
Stuart Crump, Jr., "AB1X Landline Emulator for Cellular", *Personal Communications Technology*, Jun. 1986, pp. 39, 42.
*Security*, May 1987, p. 18, "Cellular Communication Goes Off-Road to Transmit Alarms". copy in 379/40.

Primary Examiner—Keith E. George
Attorney, Agent, or Firm—Terry M. Gernstein

[57] ABSTRACT

A cellular network data transmission system including a digital communicator having a memory in which data is stored and an automatic dialer at a specific location for responding to an electrical signal indicating a specific condition exists, a cellular interface connected to the digital communicator and a cellular transceiver having an antenna, connected to the cellular interface, a cellular network including a central computer and an antenna for receiving signals from the transceiver antenna and for transmitting such signals from the central cellular computer site to a central monitoring station whereby the occurrence of a specific condition at the specific location initiates the dialing of an assigned number by the automatic dialer and the transmission of data corresponding to the specific location from the memory through the interface, transceiver and cellular network to the central monitoring station, the cellular network also adapted to receive signals initiated by the central monitoring station and to transmit such signals from the central cellular computer site to the transceiver antenna, whereby such signals are sent through the cellular network, transceiver and interface to the digital dialer and digital communicator.

19 Claims, 2 Drawing Sheets

CELLULAR NETWORK DATA TRANSMISSION SYSTEM

This invention relates to a cellular telephone monitoring system and, more particularly, to a system including an automatic dialer by means of which data is transmitted between a and a remote monitoring location through a cellular phone network.

PRIOR ART

Components are readily available commercially today by means of which data can be transmitted over a cellular phone network to a cellular site computer and from the cellular site computer to a phone company for subsequent transmission to the ultimate destination. A common example in widespread use today is the mobile cellular car phone using a handset in an automobile connected to a transceiver having an antenna by means of which voice communication is established within the cellular network. Systems for interfacing stationary telephone sets with a cellular network have also been developed, and U.S. Pat. No. 4,658,096 assigned to Metrofone, Inc. of Skokie, Illinois shows one example of such a system. In the Metrofone patent, a cellular interface is provided to which a standard telephone set is connected and the interface converts dial tones and dial pulses from the telephone into a serial data stream which is transmitted by a cellular transceiver over the cellular network.

It has also been proposed to use a cellular network in an alarm monitoring system and U.S. Pat. No. 4,577,182 assigned to Peter Miller of Chicago, Ill. is an example of such a system. In the Miller patent, alarm sensors which may be for fire, intrusion and the like are connected to a modified Acron DD-3 communicator connected in turn to a cellular transceiver. The cellular transceiver includes a keyboard programmed at installation with the telephone number of an alarm monitoring station so that when an alarm signal is produced, the digital communicator signals the transceiver via the keyboard to dial the preprogrammed telephone number of the alarm monitoring station, and only that telephone number. When the connection is made, data such as the location, emergency code, etc. is sent from the digital communicator to the cellular transceiver, which transmits this data over the air to a cellular network site and from there to the alarm monitoring station.

The lack of versatility of the system of the Miller patent is readily apparent. The Miller patent specifically states that it requires a cellular transceiver, a "modified Acron DD-3 digital communicator" and a keyboard which is programmed at the time of installation with the telephone number of the alarm monitoring station so that the system is limited to calling only one telephone number. Another shortcoming of the Miller system is that two-way communication between the digital communicator and the alarm monitoring station can only be established at the initiative of the alarm system of the subscriber's premises. No provision is made for the alarm monitoring station (or any other remote calling party) to initiate a two-way communication link with the subscriber's premises.

Furthermore, there is no provision for the alarm company to access the subscriber's equipment in a manner that permits the alarm company to make changes in the operation of the system. For example, if one of the zones in Miller system is being monitored by a sensor that, for some reason, has become faulty and is sending out false alarms, the Miller system has no provision for accessing the subscriber's alarm system from the alarm monitoring station for determining which zone is faulty and to deactivate such zone. Still further, there is no provision in the Miller system for the subscriber himself to access his system from a remote location to determine if all is well, or to activate or deactivate part or all of such system. Neither the subscriber nor the alarm company can access the Miller system to change codes if such is desired. In the Miller system, any changes to the system must be effected by an individual physically at the subscriber's premises manually changing codes. Still further, due to such lack of accesssing ability, the Miller system is not amenable for use with other systems in applications other than the monitoring of specific physical premises that are at a fixed location with fixed codes.

For these reasons, there is a need for an alarm communication system that is versatile and is amenable to a wide variety of uses and applications and can be efficiently used to alter a subscriber's alarm system as required by either the alarm monitoring station or the subscriber himself.

OBJECTS AND SUMMARY OF THE INVENTION

A primary object of the invention is to provide a new and novel location monitoring system using a cellular telephone network.

Another object of the invention is to provide a new and novel alarm system for a location using a cellular telephone network which does not require the use of telephone lines between a protected location and an alarm monitoring station.

Still another object of the invention is to provide a new and novel location monitoring system using a cellular network in which data may be sent not only from the location to an amarm monitoring station but the location may be interrogated from the alarm monitoring station for information pertaining to the location.

A still further object of the invention is to provide a new and novel location monitoring system which may be simply and easily moved to a new location at virtually no expense and in a simple and easy manner.

Still another object of the invention is to provide a new and novel monitoring system using a cellular network which is readily portable for use in movable structures such as aircraft, railroad cars, etc. so as to be completely operable at each location to which the structure is moved.

A still further object of the invention is to provide a new and novel monitoring system using a cellular network which permits the transmission of still video images of the monitored location to an alarm monitoring station.

A still further object of the invention is to provide a new and novel monitoring system using a cellular network which is versatile and which can be efficiently altered either by the subscriber himself or by the alarm monitoring station (or alarm company) as the need arises.

Still another object of the present invention is to provide a new and novel monitoring system using a cellular network which is amenable for use with other monitoring networks and systems.

Still another object of the present invention is to provide a new and novel method of monitoring premises using a cellular network.

Still another object of the present invention is to provide a new and novel method of monitoring premises using a cellular network in a manner such that the monitored areas can be moving from place to place.

Still another object of the present invention is to provide a new and novel alarm monitoring system using a cellular network in which the cellular components of the alarm system located at the subscriber's premises do not depend on a keyboard (pre-programmed or otherwise) and/or a modified Acron DD-3 digital communicator.

Still another object of the present invention is to provide a new and novel alarm monitoring system in which the cellular components of the alarm system located at the subscriber's premises utilize a cellular data interface without a keyboard, that can be interfaced to practically any digital communicator without any modifications.

The objects of the invention and other related objects are accomplished by the provision at a monitored location of means for generating an electrical signal and for conducting the electrical signal to a digital communicator having a digital dialer and programmable means, the digital communicator being connected to a cellular interface connected in turn to a cellular transceiver having an antenna. The digital dialer is activated upon receipt of the electrical signal, and the number of an alarm monitoring station is sent from the digital dialer by the cellular interface to the transceiver so as to call the alarm monitoring station over a cellular network including an antenna wherein data concerning the monitored site is provided by the programmable means to the alarm monitoring station.

The programmable means of the alarm system at the subscriber's premises can be accessed from the outside by the alarm monitoring station (or alarm company) via the cellular interface so as either to query that alarm system or to change some feature thereof as necessary. In such manner, the monitored system can be changed as necessary to meet the exact needs of the system, even if such needs are changed during a particular monitoring operation. Such accessing capability adds versatility to the present system and makes it amenable for use in a wide variety of applications not heretofore envisioned for such systems.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
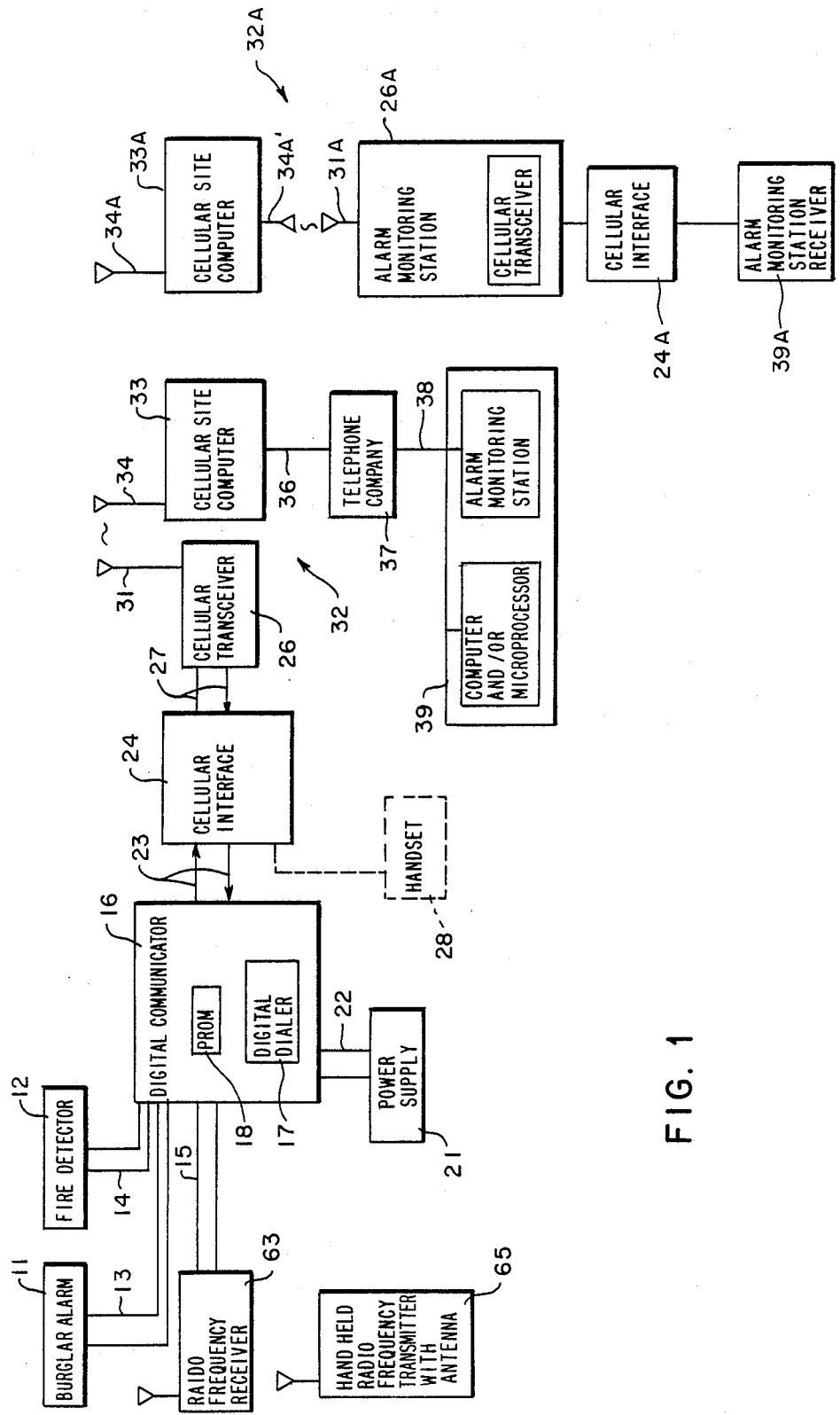
FIG. 1 is a schematic illustrating the system and its components for the cellular network embodying the present invention.

Referring now to the drawings and to FIG. 1 in particular, there is shown one embodiment of the cellular network data transmission system of the invention. In the embodiment of FIG. 1, an alarm monitoring system is shown wherein one or more sensors of conventional construction are installed at various locations in a location such as a residence which, by way of example, include a burglar alarm 11 and a fire detector 12. As is well known, a plurality of such sensors can be used and such sensors 11, 12 are of the type for generating an electrical signal in response to the detected event, and these signals are conducted, for example, by means of conductors 13, 14 respectively to a digital communicator 16 of a well known construction. One such digital communicator is Model DD-1486 available from Napco Security Systems, Inc. of 6 DiTomas Court, Copiague, N.Y. 11726.

The digital communicator 16 includes a digital dialer 17 and programmable memory means such as a PROM 18. The PROM 18 is programmed with specific data such as the identification number of the location, account number, the emergency code (for fire, burglary, etc.) and the telephone number of the alarm monitoring station to be called as will be explained hereinafter. It should be understood that the PROM 18 may be readily replaced with another PROM if the location is changed. The digital communicator 16 is connected to a suitable source of electric power such as power supply 21 connected to the digital communicator 16 by means of conductors such as conductors 22.

The output of the digital communicator 16 and digital dialer 17 is connected by means of conductors 23 to a cellular interface 24 of any well known construction. This connection may be accomplished with the use of an RJ11 cord and plug available from Radio Shack or any establishment selling telephone accessories. For example, such a cellular interface is readily available from Motorola under the trademark "CELLULAR CONNECTION".

Such a cellular interface 24 provides a telephone line tone and voltage to the digital communicator 16 and digital dialer 17 and, upon receiving the electronic signal (that comprises the telephone number to be dialed) from the digital dialer 17, that signal and an electronic "send" signal are then electronically entered into the transceiver 26 by means of conductors 27. The cellular interface provides a path of communication between the digital communicator 16 and digital dialer 17, and the cellular transceiver 26.

The cellular transceiver 26 may be of any well known construction such as a cellular transceiver manufactured by Motorola under the model designated MODAR-1. It should be noted that the cellular interface 24 can also be provided with a port by means of which a conventional telephone or cellular handset 28 (shown in broken lines in FIG. 1) may be connected to the interface 24 (to make and receive two-way telephone calls) if so desired. Allowing two-way communication, the transceiver 26 also includes an antenna 31 by means of which data may be transmitted over-the-air to the cellular network designated generally in FIG. 1 by the reference numeral 32.

The cellular network antenna site 32 includes a cellular site computer 33 and an antenna 34 by means of which transmissions emanating from the transceiver antenna 31 are received. The cellular site computer 33 is connected by conventional telephone land lines 36 to the commercial telephone company 37 which is connected by conventional telephone land lines 38 to the alarm monitoring station 39. The alarm monitoring station 39 is also provided with a computer and/or microprocessor.

In the operation of the system of FIG. 1, the system is is activated by an electrical signal generated by one of the sensors 11, 12 which signal is transmitted to the digital communicator 16. A telephone line tone signal is sent to the digital dialer 17 from the cellular interface 24. The digital dialer 17 then transmits the telephone number of the alarm monitoring station 39 to the transceiver 26, via the interface 24 which sends this number over the cellular network 32 from antenna 31 to antenna 34.

The telephone connection is made from the cellular site computer 33 to the telephone company 37 connected by conventional telephone land lines 36, to the alarm monitoring station 39, also connected by conventional telephone lines 38. A "handshake" tone is sent back to the digital communicator 16 from the alarm monitoring station 39 computer following which data appropriately stored in PROM 18 is sent to the alarm monitoring station to complete the transmission of the emergency regarding the alarm condition. Communication is terminated by a "kiss-off" tone transmitted from the alarm monitoring station 39 to the transceiver 26, and proper notification of the police, fire department, etc. is accomplished by the alarm monitoring station.

Some currently available digital communicators can be programmed with several different telephone numbers so that in case no "hand-shake" signal is received from a central monitoring station computer after several transmission attempts, the digital communicator will "call" the other telephone numbers programmed within its PROM until the digital communicator gets a "hand-shake" signal from an alarm monitoring station computer so that its emergency codes can be sent and received. Those telephone numbers may be to different telephone lines at the same alarm monitoring station or to a different alarm monitoring station.

The cellular network 32 may, via its antenna 34 retransmit the signal it receives from the subscriber's cellular transceiver 26 via its antenna 31 (without going through a conventional telephone land line network) to another cellular network 32A having a cellular site computer 33A which includes antennas 34A and 34A' connected thereto, and via antennas 34A' and 31A, to a cellular transceiver located at the alarm monitoring station 26A in FIG. 1, and then to a cellular interface 24A, also at the alarm monitoring station 39A in FIG. 1, wired to an alarm monitoring station's data processing computer.

The system in FIG. 1 provides two-way communication as the microprocessor at the alarm monitoring station 39 can "call-up" the alarm system at the subscriber's location and obtain data as to the operation of the alarm system, such as defects, operating conditions, past alarm history, etc.

Thus, the system of FIG. 1 can be said to be capable of both "uploading" and "downloading".

The alarm monitoring station 39 can call the monitored alarm system on the subscriber's premises via the network as above described, and the PROM can be programmed to "open-up" its memory to the alarm monitoring station, or to "hang-up" the line and call back either a special telephone number or to call back the alarm monitoring station computer. This is accomplished after a predetermined number of rings is allowed at the subscriber's premises by the initiating caller, i.e. the alarm monitoring station. After a "connection" is made between the alarm monitoring station computer and the monitored alarm system on the subscriber's premises, a special "code" is sent by the alarm monitoring station computer to the monitored alarm system which then "opens up" its memory to the alarm monitoring station computer for interrogation and/or re-programming. This is accomplished on receipt of a special code from the alarm monitoring station computer. The PROM will be placed in a code-amending mode whereby various codes within the alarm system on the subscriber's premises can be altered, amended, disconnected or the like. Of course, if the proper code signal is not received from the alarm monitoring station (or other location) and in the proper manner, the alarm system at the subscriber's premises will not permit access to its memory.

If so desired, the alarm system at the subscriber's premises can be programmed to alert proper authorities that an unauthorized entry has been attempted if the proper code is not received. After the codes have been appropriately amended, another signal from the alarm monitoring station or the caller can be sent which causes the PROM to "close up" the subscriber's alarm system with the amended code therein.

In this manner, the alarm features can be altered by simply accessing the monitored premises from any convenient location and changing the codes as needed. For example, if the alarm monitoring station 39 notes a continued alarm signal, which it notes as being false, it can disarm the faulty alarm signal. Also, the codes can be altered if either subscriber or the alarm monitoring station sees the need.

Still further, the alarm system can be used in conjunction with other systems so that the premises can be monitored by other means as well. For example, the alarm system can be used in conjunction with microphones or the like so the subscriber or the alarm monitoring station can listen to the premises if necessary by simply accessing the system as above discussed and sending an appropriate signal to the system.

Still further, this system can be adapted to be used in conjunction with other systems that include the hardwired telephone lines. The system can be accessed via the telephone land lines, and if such lines are out of operation for some reason, the system can be controlled to operate exclusively via the cellular network. In such a case, the alarm system will have an automatic backup in the event of a problem.

Figure 2:
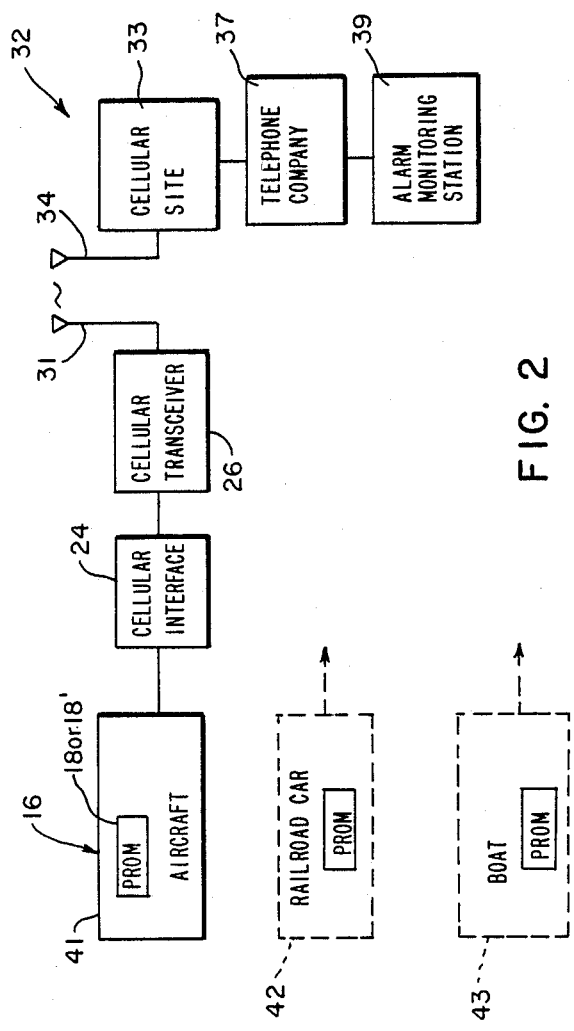
FIG. 2 is a schematic of another embodiment of the cellular system of the present invention.

Referring now to FIG. 2 wherein like numerals identify like parts, the data transmission system of the invention may by used to monitor structures that are mobile rather than stationary. By way of example, the sensors 11, 12, etc., the digital communicator 16, cellular interface 24 and cellular transceiver 26 may be installed on an aircraft 41 or a railroad car 42 or a boat 43 or the like. To accomplish this, the installed PROM corresponding to an original location is removed after arrival of the aircraft, etc. at the new location, and a PROM having data corresponding to the new location is inserted in the digital communicator 16. The telephone number of the alarm monitoring station 39 can remain the same as the data transmitted from the new location would be transmitted over the telephone land lines from the cellular site computer 33 to the original alarm monitoring station 39. Interrogation of the aircraft at the new location would verify its arrival and its condition. Any changes in codes, etc. could be made via the uploading and downloading features of the system of the invention. The same procedure would be followed with the system installed aboard the railroad car 42 to confirm its arrival, location and condition.

Figure 3:
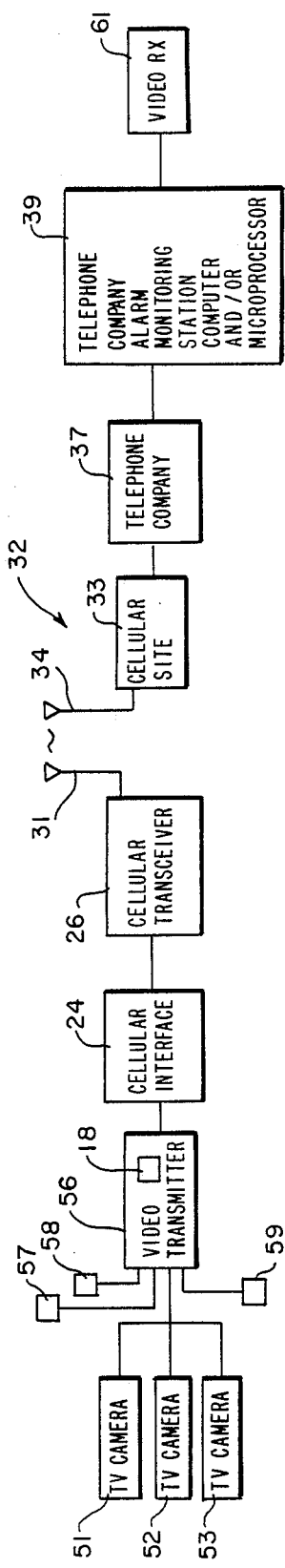
FIG. 3 is a schematic of another embodiment of the cellular network of the present invention.

Referring now to FIG. 3 wherein like numerals are used to identify like parts, a third embodiment of the system of invention is shown. In FIG. 3, one or more TV cameras 51-53 may be installed at the subscriber's premises, these cameras being directed at those areas of the premises which are to be monitored. These cameras 51-53 are connected to a commercially available video transmitter 56 which digitizes BW video images and stores them in memory. One type of such video transmitter is Model RVS3000TX Phoneline Video Transmitter manufactured by Robot Research Inc. of San Diego, Calif.

The video transmitter 56 includes an auto-dialer and a switcher to sequence the various TV cameras associated therewith. The video transmitter 56 is connected to the cellular interface 24 as in the manner of the digital communicator 16 and may be associated with alarm sensors 57-59 such as sensors 11, 12 in FIG. 1. The video transmitter 56 is adapted to send freeze-frame black and white video images as determined by the TV cameras 51-53 and preferably each of the alarm sensors 57-59 is associated with one of the TV cameras 51-53 respectively.

When one of the sensors 57-59 responds to an alarm condition, a video camera image from the corresponding camera 51-53 is stored in the video transmitter memory. The cellular interface 24 provides a dial tone signal and voltage as in the previous embodiments, and the auto-dialer in the video transmitter dials the phone number of the alarm monitoring station 39. When a "handshake" signal from the alarm monitoring station 39 is received by the video transmitter 56, a video picture of the area of the site corresponding to the associated TV camera together with such data as the location identification, time and date, camera identification, etc. is transmitted by the transceiver 26 to the cellular site computer 33 and on to the alarm monitoring station 39.

It is necessary to provide a video receiver 61 at the alarm monitoring station 39 for the video images and other data, and such a receiver is also commercially available from the aforementioned Robot Research Inc. as Model RVS3000RX. The image and data can then be recorded from this receiver and stored on a VCR. Two-way communication is also available in the system of FIG. 3. The video transmitter 56 is adapted to auto-answer when dialed directly from a remote location such as the alarm monitoring station 39. With the correct access code, the transmitter will transmit any selected video image and arm or disarm the alarm sensors 57-59 associated with CCTV cameras 51-53 to upload and/or download.

The versatility of the present system due to its ability to be uploaded and downloaded, permits it to be used as a personnel monitoring system. In such an application, the person being monitored will wear an alarm activator that can be interrogated as necessary and which is coupled into the main network via the digital communicator either remotely or via direct wiring. The person being monitored can send a code to the alarm monitoring station which lets that station know where that person is at the time of the signal. If there is an emergency, the person can signal, and help can be dispatched accordingly. Such a system is particularly useful for night watchmen, or for the protection of people that must visit remote locations with strangers. This is an especially useful system for real estate agents who must often accompany strangers to empty houses in remote locations.

In such applications, an individual is provided with a unit including a digital communicator 16, cellular interface 24, cellular transceiver 26, wireless radio frequency receiver 63 connected by conductors 15 to a digital communicator 16, and a hand-held wireless radio frequency transmitter 65. This equipment could be installed in a vehicle or the like. The individual carries the hand-held wireless radio frequency transmitter 65, by means of which the individual is provided with a link to the digital communicator 16 and transceiver 26 via the wireless radio frequency receiver 63. The individual, using the transmitter 65, can file an itinerary prior to to leaving a location so that in an emergency, the digital communicator 16 and digital dialer 17 can be activated by the wireless radio frequency transmitter 65 and the wireless radio frequency receiver 63, causing the transceiver 26 to transmit a signal signifying such a condition to the alarm monitoring station.

The above-described personnel monitoring system can also be used in conjunction with the above-discussed television monitors if necessary.

Still another application of the just-described system is the so-called house arrest situation. In this situation, someone is required to remain in a prescribed area at all times. The person could be required to wear a mobile unit, such as described in U.S. Pat. No. 4,593,273, and such a unit would signal a central location via the cellular network in the event the person moved out of the prescribed area. In the event the person is permitted to move to other areas, such as to an office or the like, the system could also be used in conjunction with substance abuse programs in which the monitored person is required to call in at specified times or be called. At such times, the person's condition is assessed by means known to those skilled in su art, as by voice analysis or the like. If the person is deemed fit, the codes in the monitoring system can be set to permit that person to move to other locations or to be required to return to a particular location for further evaluation.

It is to understood that while certain forms of the present invention have been illustrated and described herein, it is not to be limited to the specific forms or arrangement of parts described and shown.

What is claimed is:

1. A system for transmitting data from a specific location such as from a subscriber's premises to a central cellular network comprising, in combination, at least one alarm circuit for responding to a specific condition at said specific location for generating an electrical signal in response to said specific condition, a digital communicator including programmable means and an automatic digital dialer, means for connecting said alarm circuit to said digital communicator, a cellular interface, means for connecting said digital communicator to said cellular interface, a cellular transceiver having an antenna, a central cellular network having an antenna in telecommunication with said transceiver antenna and means for connecting said cellular interface with said cellular transceiver whereby data from said programmable means is transmitted over-the-air to said central cellular network in response to said specific condition, and said system further comprising a first alarm monitoring station and a telephone land line connecting said first alarm monitoring station to said central cellular network antenna and a second alarm monitoring station which includes means to connect the second alarm monitoring station to said first alarm monitoring station over-the-air via said cellular network.

2. A system in accordance with claim 1 wherein said programmable means is programmed to provide digital data including at least one telephone number of a location to be called.

3. A system in accordance with claim 2 wherein said digital data from said programmable means includes an account number and a zone identification corresponding to the location of said digital communicator.

4. A system in accordance with claim 3 wherein said programmable means comprises a PROM.

5. A system in accordance with claim 4 wherein said PROM is interchangeable with a second PROM having a different set of data.

6. A system in accordance with claim 4 wherein said PROM is erasable and reprogrammable with new data.

7. A system in accordance with claim 4 wherein said first alarm monitoring station includes a computer in communication with said telephone land line.

8. A system in accordance with claim 7 including a further cellular transceiver and a second cellular interface at said second alarm monitoring station.

9. A system in accordance with claim 7 wherein said first alarm monitoring station includes means for transmitting data from said first alarm monitoring station through said telephone land line said central cellular network, said cellular transceiver and said cellular interface to said PROM for reprogramming said PROM.

10. A system in accordance with claim 1 wherein said specific location is movable.

11. A system in accordance with claim 10 wherein said movable specific location comprises an aircraft.

12. A system in accordance with claim 10 wherein said movable specific location comprises a railroad car.

13. A system in accordance with claim 10 wherein said movable specific location comprises a watercraft.

14. A system in accordance with claim 10 wherein said movable specific location comrises a motor vehicle such as a motor home, mobile home, tractor, tractor/trailer or the like.

15. A system in accordance with claim 14 wherein said alarm circuit comprises a radio frequency receiver and means for linking said radio frequency receiver to said digital communicator.

16. A system in accordance with claim 15 wherein said radio frequency receiver comprises a radio frequency transmitter whereby activation of said radio frequency transmitter at a predetermined distance from said radio frequency receiver will generate said electrical signal and transmit said electrical signal from said radio frequency receiver to said digital communicator.

17. A system in accordance with claim 15 wherein said radio frequency transmitter is an out-of-range type.

18. A system in accordance with claim 1 including at least one closed circuit television camera at said specific location for producing a TV image of said specific location, a video transmitter at said specific location connected to said TV camera and to said digital communicator, a video receiver operatively associated with said first alarm monitoring station, said video transmitter being adapted to respond to said electrical signal for transmitting said TV image to said video receiver.

19. A system in accordance with claim 18 including means associated with said first alarm monitoring station for activating said video transmitter for transmission of said TV image to said video receiver.

* * * * *

UNITED STATES PATENT AND TRADEMARK OFFICE
CERTIFICATE OF CORRECTION

PATENT NO.  : 4,825,457

DATED       : Apr. 25, 1989

INVENTOR(S) : Mayer M. Lebowitz

It is certified that error appears in the above-identified patent and that said Letters Patent is hereby corrected as shown below:

Column 1, Line 8
Omission between "a and a" the word "location" is omitted

Column 2, Line 40
alarm is misspelled

Signed and Sealed this

Sixth Day of March, 1990

*Attest:*

JEFFREY M. SAMUELS

*Attesting Officer*  *Acting Commissioner of Patents and Trademarks*